United States Patent
Abe et al.

(10) Patent No.: US 8,180,102 B2
(45) Date of Patent: May 15, 2012

(54) IMAGE PROCESSING DEVICE, IMAGE PROCESSING METHOD, PROGRAM, AND RECORDING MEDIUM

(75) Inventors: Yasushi Abe, Yokohama (JP); Masaichi Niro, Kawasaki (JP); Hiroshi Shimura, Yokosuka (JP); Masaaki Ishikawa, Tokyo (JP); Taeko Ishizu, Yashio (JP); Motohiro Kuroda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1077 days.

(21) Appl. No.: 12/076,460

(22) Filed: Mar. 19, 2008

(65) Prior Publication Data

US 2008/0240495 A1    Oct. 2, 2008

(30) Foreign Application Priority Data

Mar. 19, 2007  (JP) .................................. 2007-070827
Feb. 29, 2008  (JP) .................................. 2008-051302

(51) Int. Cl.
    *G06K 9/00*    (2006.01)
(52) U.S. Cl. ........................................................ 382/100
(58) Field of Classification Search .................. None
    See application file for complete search history.

(56) References Cited

U.S. PATENT DOCUMENTS

| | | | |
|---|---|---|---|
| 6,289,131 B1 | 9/2001 | Ishikawa | |
| 6,580,804 B1 | 6/2003 | Abe | |
| 6,741,722 B2 | 5/2004 | Abe | |
| 6,901,236 B2 | 5/2005 | Saitoh et al. | |
| 7,139,429 B2 | 11/2006 | Shimura | |
| 2001/0040978 A1 | 11/2001 | Abe | |
| 2002/0146174 A1 | 10/2002 | Shimura | |
| 2004/0071364 A1* | 4/2004 | Yamazaki et al. | 382/276 |
| 2004/0090646 A1 | 5/2004 | Saitoh et al. | |
| 2004/0131265 A1 | 7/2004 | Yagishita et al. | |
| 2004/0148261 A1 | 7/2004 | Abe | |
| 2004/0174567 A1 | 9/2004 | Abe et al. | |
| 2004/0184065 A1 | 9/2004 | Guan et al. | |
| 2004/0208339 A1 | 10/2004 | Abe et al. | |
| 2004/0258276 A1 | 12/2004 | Ishii et al. | |
| 2005/0018845 A1 | 1/2005 | Suzaki | |
| 2005/0041263 A1 | 2/2005 | Ishikawa et al. | |
| 2005/0052682 A1 | 3/2005 | Ishikawa et al. | |
| 2005/0088701 A1 | 4/2005 | Uchida et al. | |
| 2005/0151989 A1 | 7/2005 | Shimura et al. | |
| 2005/0151990 A1 | 7/2005 | Ishikawa et al. | |
| 2005/0152006 A1 | 7/2005 | Abe et al. | |

(Continued)

FOREIGN PATENT DOCUMENTS

JP    08-154177    6/1996

(Continued)

OTHER PUBLICATIONS

European Search Report dated Jun. 2, 2008 for counterpart European Application No. 08250976.3-1522.

(Continued)

*Primary Examiner* — Claire X Wang
(74) *Attorney, Agent, or Firm* — Harness, Dickey & Pierce, P.L.C.

(57) ABSTRACT

An image processing device including an area generation unit configured to generate a supplemental data-embedded area in image data having content data separate from an area occupied by the content data, and a data embedding unit configured to embed supplemental data in the supplemental data-embedded area.

15 Claims, 11 Drawing Sheets

U.S. PATENT DOCUMENTS

| | | |
|---|---|---|
| 2005/0180596 A1 | 8/2005 | Abe et al. |
| 2006/0007500 A1 | 1/2006 | Abe et al. |
| 2006/0072782 A1 | 4/2006 | Abe et al. |
| 2006/0126098 A1 | 6/2006 | Shimura et al. |
| 2006/0164693 A1 | 7/2006 | Matsumoto et al. |
| 2006/0256362 A1 | 11/2006 | Guan et al. |
| 2006/0279792 A1 | 12/2006 | Ishizu et al. |
| 2007/0003341 A1 | 1/2007 | Guan et al. |
| 2007/0153303 A1 | 7/2007 | Abe et al. |
| 2007/0297644 A1 | 12/2007 | Ishikawa et al. |

FOREIGN PATENT DOCUMENTS

| | | |
|---|---|---|
| JP | 2695523 | 9/1997 |
| JP | 2000-175026 | 6/2000 |
| JP | 2003-143391 | 5/2003 |
| JP | 2003-298831 | 10/2003 |
| JP | 2004-274092 | 9/2004 |
| JP | 2005-323005 | 11/2005 |
| JP | 2006-042217 | 2/2006 |
| JP | 2007-194997 | 8/2007 |
| JP | 4266766 | 5/2009 |

OTHER PUBLICATIONS

Applicants enclose an English Language Abstract of Japanese Patent Publication No. JP 04-170569 dated Jun. 18, 1992.

Japanese Office Action dated Jan. 17, 2012 issued in corresponding Japanese Appln. No. 208-051302.

* cited by examiner

FIG. 7
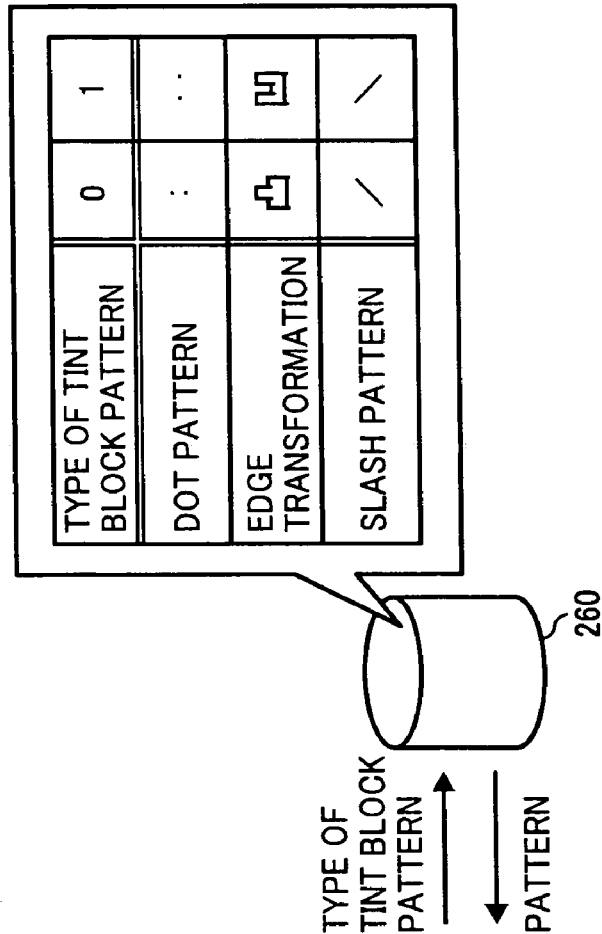
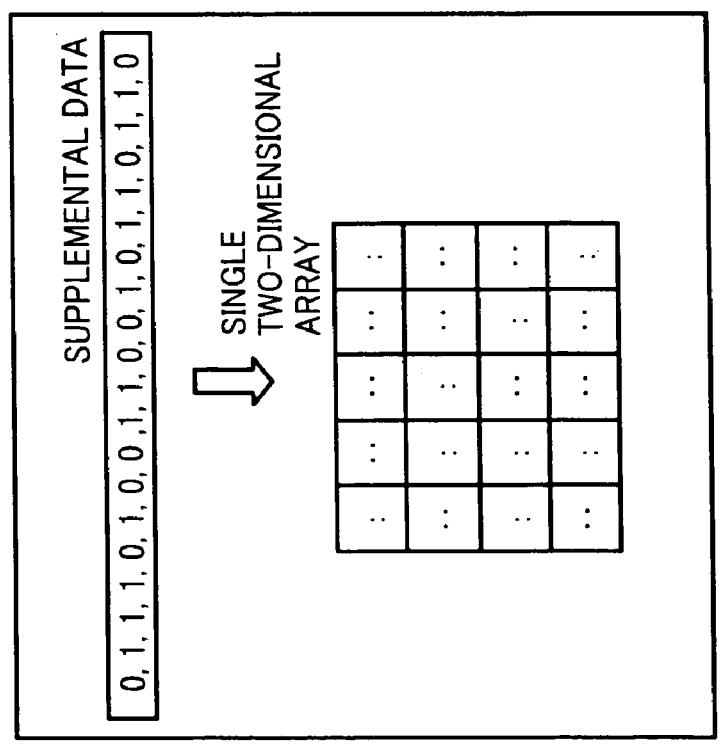

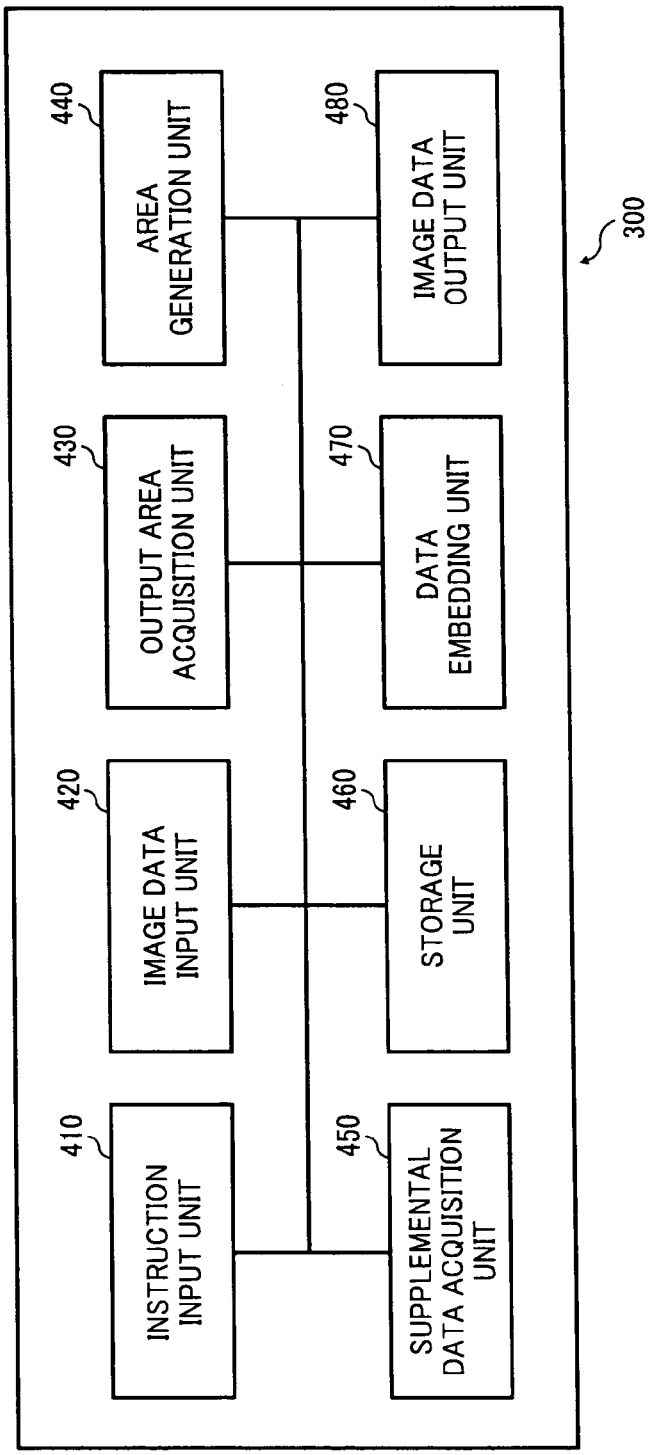

IMAGE PROCESSING DEVICE, IMAGE PROCESSING METHOD, PROGRAM, AND RECORDING MEDIUM

PRIORITY STATEMENT

The present patent application claims priority from Japanese Patent Application Nos. 2007-070827, filed on Mar. 19, 2007 in the Japan Patent Office, and 2008-051302, filed on Feb. 29, 2008 in the Japan Patent Office, the entire contents of each of which are hereby incorporated herein by reference.

BACKGROUND

1. Technical Field

Example embodiments generally relate to an image processing device to embed supplemental data in image data, an image processing method employed in the image processing device, a program for causing a computer to execute the image processing method, and a recording medium storing the program.

2. Description of the Related Art

Recent improvements in image processing technique enable exact copies to be made of original documents that are indistinguishable from the originals. Consequently, in order to prevent illegal duplication of important documents such as paper money and securities, there is increasing demand for technology that may prohibit or prevent such precise duplication.

Various methods have been proposed to restrict duplication of the important documents, confidential documents, or the like. For example, one proposed method superimposes a dot pattern on image data that is read together with the image data. When the image data is read and a dot pattern identical to a pre-stored duplication prohibition pattern is detected from such read image data, it is determined that the read image data is prohibited from being duplicated.

In the above-described method, however, there is a problem in terms of the method of superimposing the dot pattern on the image data. Specifically, because the dot pattern indicating prohibition against duplication is superimposed on the entire area of the image data including content, the dot pattern is superimposed even on the content such as a document or a photograph as illustrated in FIG. 1, degrading visual quality of the content data included in the image data.

SUMMARY

Example embodiments provide an image processing device to maintain good visual quality of content data included in image data even when additional copy prevention-related data is embedded in the image data, an image processing method employed in the image processing device, a program for causing a computer to execute the image processing method, and a recording medium storing the program.

At least one embodiment provides an image processing device including an area generation unit configured to generate a supplemental data-embedded area in image data having content data separate from an area occupied by the content data, and a data embedding unit configured to embed supplemental data in the supplemental data-embedded area.

At least one embodiment provides an image processing method including generating a supplemental data-embedded area in image data having content data separate from an area occupied by the content data, and embedding supplemental data in the supplemental data-embedded area.

At least one embodiment provides a program for causing a computer to perform the image processing method described above.

At least one embodiment provides a computer readable recording medium storing the program described above.

Additional features and advantages of the example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein:

FIG. 7 is a view illustrating another example of the processing performed by the data embedding unit;

FIG. 11 is a functional block diagram illustrating the PC according the second example embodiment;

FIG. 12 is a view illustrating an example of data stored in a storage unit; and

Figure 1:
FIG. 1 is a view illustrating image data on which a tint block pattern is superimposed by using a related-art technique.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of example embodiments.

The terminology used herein is for the purpose of describing example embodiments only and is not intended to be limiting. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Reference is now made to the drawings, wherein like reference numerals designate identical or corresponding parts throughout the several views.

An image processing device according to a first example embodiment is described in detail below with reference to FIGS. 2 through 8. It is to be noted that although a multifunctional peripheral (MFP) 100 having two or more of copying, printing, scanning, and facsimile functions is used as the image processing device according to the first example embodiment in the description below, alternatively other types of devices, including but not limited to a facsimile machine, a printer, a personal computer, an entertainment device, a cellular phone, a car navigation system, and so forth, may also be used as the image processing device.

In the description below, "content data" means contents included in image data, such as characters, text, drawings, tables, and photographs, and a "tint block pattern" means a pattern embedded in image data, such as a dot pattern, a bar code, and a two-dimensional bar code (QR code).

Figure 2:
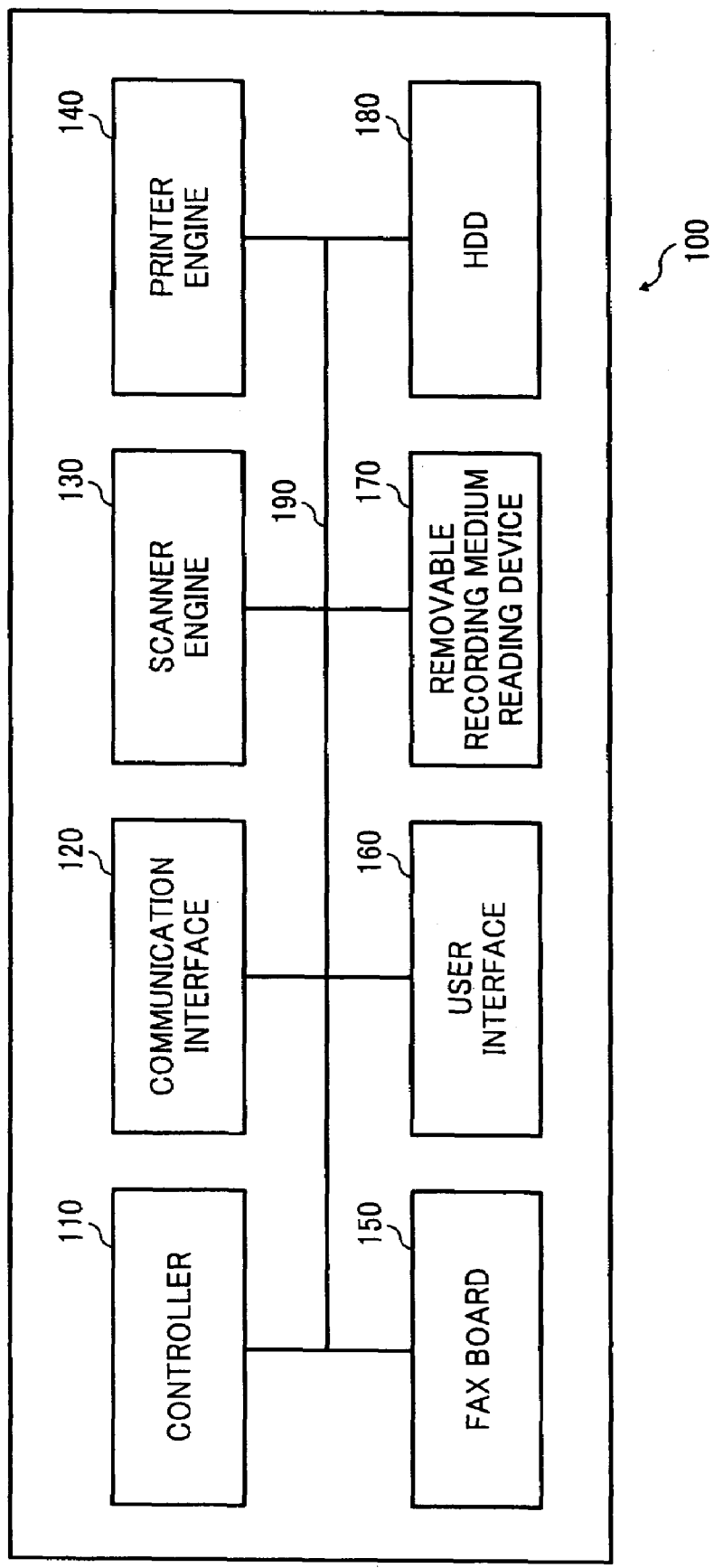
FIG. 2 is a schematic view illustrating a hardware configuration of an MFP (multifunctional peripheral) serving as an image processing device according to a first example embodiment.

FIG. 2 is a schematic view illustrating a hardware configuration of the MFP 100 serving as the image processing device according to the first example embodiment. Referring to FIG. 2, the MFP 100 includes a controller 110, a communication interface 120, a scanner engine 130, a printer engine 140, a fax board 150, a user interface 160, a removable recording medium reading device 170, a hard disk drive (HDD) 180, and a bus line 190.

The controller 110 controls overall processing performed in the MFP 100. The controller 110 includes a central processing unit (CPU) 111, a read-only memory (ROM) 112 in which default data such as a program to control the CPU 111 is stored in advance, and a main memory 113 to temporarily store a variety of data.

The communication interface 120 communicates with external devices of the MFP 100 under the control of the controller 110. The communication interface 120 may include an Ethernet (trademark) interface, an IEEE 1284 interface, or other interface.

The scanner engine 130 reads image data under the control of the controller 110.

The printer engine 140 prints an image on a recording medium under the control of the controller 110. The printer engine 140 may include a laser beam printer, an inkjet printer, or other printer.

The fax board 150 performs facsimile communication under the control of the controller 110.

The user interface 160 displays data sent from the controller 110, and sends data input by a user to the controller 110. In other words, the user may obtain and input the data through the user interface 160. The user interface 160 may include, for example, a display such as a liquid crystal display (LCD) or a cathode ray tube (CRT) display, a pointing device such as a mouse and a touch pen, a keyboard, a touch panel, an audio interface, and so forth.

The removable recording medium reading device 170 reads data recorded on a removable recording medium such as an IC card and a floppy disk under the control of the controller 110. The removable recording medium reading device 170 accesses the removable recording medium based on an instruction from the controller 110 and reads out the data recorded on the removable recording medium to inform the controller 110 of the data.

The HDD 180 writes and reads data. The bus line 190 electrically connects the controller 110 to the communication interface 120, the scanner engine 130, the printer engine 140, the fax board 150, the user interface 160, the removable recording medium reading device 170, and the HDD 180. An address bus, a data bus, or the like may be used as the bus line 190.

In the MFP 100 with the above-described configuration, a print job is issued by selecting the printer engine 140, and a scan job is issued by selecting the scanner engine 130. Moreover, a copy job is issued by selecting both the printer engine 140 and the scanner engine 130, and facsimile reception and transmission jobs are issued by selecting the printer engine 140, the scanner engine 130, and the fax board 150.

A description is now given of functions provided in the MFP 100.

Figure 3:
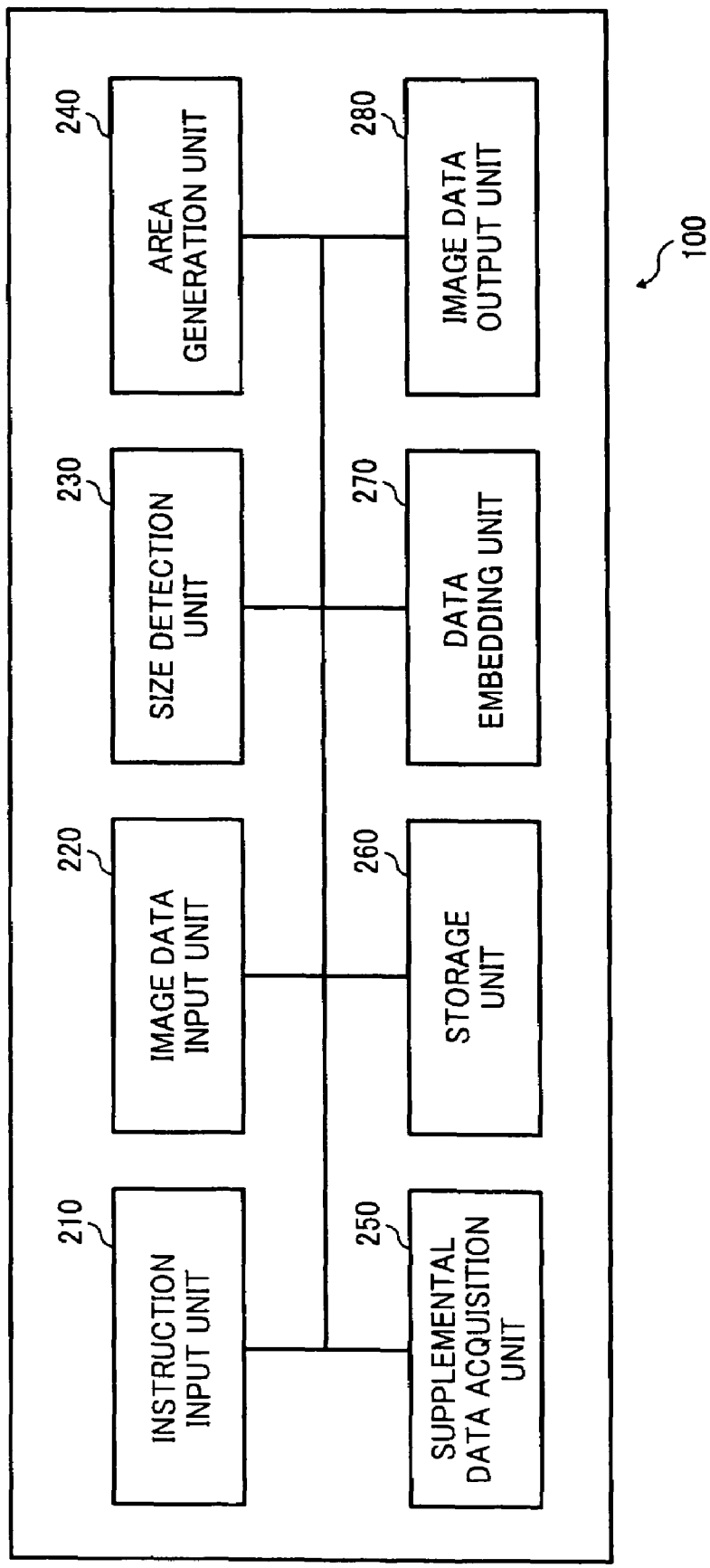
FIG. 3 is a functional block diagram illustrating the MFP according to the first example embodiment.

FIG. 3 is a functional block diagram illustrating the MFP 100 according to the first example embodiment. Referring to FIG. 3, the MFP 100 includes an instruction input unit 210, an image data input unit 220, a size detection unit 230, an area generation unit 240, a supplemental data acquisition unit 250, a storage unit 260, a data embedding unit 270, and an image data output unit 280.

The instruction input unit 210 receives an instruction from the user operating the MFP 100. Specific examples of the instruction received from the user include instructions to input and output image data and to set input and output conditions. In addition, the instruction input unit 210 receives an instruction to embed supplemental data in the image data. The instruction input unit 210 may provide an instruction menu to the user to prompt the user to input an appropriate instruction. Here, the user interface 160 illustrated in FIG. 2 serves as the instruction input unit 210.

The image data input unit 220 generates or acquires image data in which supplemental data is to be embedded, and inputs the image data. The input image data is stored in the storage unit 260. Either the communication interface 120 or the scanner engine 130, each illustrated in FIG. 2, may serve as the image data input unit 220.

The size detection unit 230 detects a size of the image data input by the image data input unit 220. The size of the image data may be detected based on a paper size, such as an A3 size and an A4 size, or a size defined by image resolution. Either the controller 110 or the scanner engine 130, each illustrated in FIG. 2, may serve as the size detection unit 230.

The area generation unit 240 generates an area in which the supplemental data is to be embedded (hereinafter "supplemental data-embedded area") in the image data based on the content data included in the image data. Specifically, the area generation unit 240 generates the supplemental data-embedded area surrounding the content data. Here, the controller 110 illustrated in FIG. 2 serves as the area generation unit 240.

A description is now given of processing performed by the area generation unit 240.

The area generation unit 240 acquires the image data to be processed from the storage unit 260 to be described in detail later, and generates a circumscribed rectangular area (hereinafter "first content") where the content data included in the image data exists. The area generation unit 240 specifies a background color of the image data and extracts pixels in the circumscribed rectangular area without having the background color to acquire the first content. Various known methods may be used to specify the background color. For example, a color histogram of the image data may be created to specify a color occupying the largest percentage of the background as the background color.

The area generation unit 240 then specifies another area within the image data other than the first content, and from this other area generates a supplemental data-embedded area such that the supplemental data-embedded area does not overlap the first content.

A size detected by the size detection unit 230 may be used as the size of the image data.

The first content is not limited to the circumscribed rectangular area generated as described above.

The supplemental data-embedded area may be generated by extracting an outline of the image data and acquiring the first content.

Alternatively, a histogram of pixels in the image data may be obtained, and the first content may be acquired from the histogram thus obtained, with the supplemental data-embedded area generated based on the first content thus acquired. In other words, the histogram of the pixels in the image data is obtained from an edge of the image data and from a portion where an amount of change in the histogram is greater than a predetermined or desired threshold is determined as an edge of the first content. Thus, an area the boundaries of which extend from the edge of the image data to the portion determined as the edge of the first content may be generated as the supplemental data-embedded area.

Alternatively, a differential value of each pixel in the image data may be obtained, and the edge of the first content may be detected based on the differential value thus obtained. Therefore, an area the boundaries of which extend from the edge of the image data to the edge of the first content thus detected may be generated as the supplemental data-embedded area. The differentials value may be obtained by using a known method, such as an image filter.

Figure 4:
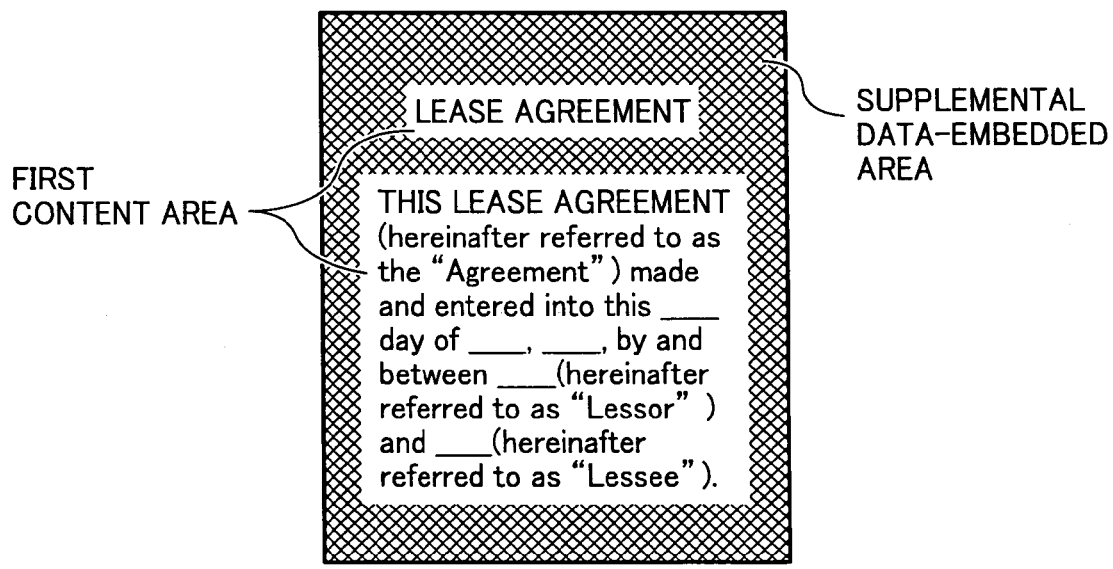
FIG. 4 is a view illustrating an example of supplemental data embedded in image data by the image processing device according to the first example embodiment.
Figure 5:
FIG. 5 is a view illustrating another example of the supplemental data embedded in the image data by the image processing device according to the first example embodiment.

In a case in which a plurality of first contents is acquired, an area including all of the acquired first contents is acquired as a second content. Thus, the supplemental data-embedded area may be generated by specifying an area within the image data other than the second content. As a result, a tint block pattern does not appear between each of the content data in the image data, so that higher visual quality of the content data may be provided. However, because a larger supplemental data-embedded area may be obtained, a larger amount of data may be added to the image data by superimposing the tint block pattern on the image data based on the first content. FIG. 4 illustrates an example of the image data on which the tint block pattern is superimposed based on the first content, and FIG. 5 illustrates an example of the image data on which the tint block pattern is superimposed based on the second content.

Furthermore, the area generation unit 240 may generate the supplemental data-embedded area based on a designation of a shape of the supplemental data-embedded area (hereinafter "area shape") input by the user through the instruction input unit 210. In other words, the supplemental data-embedded area corresponding to the area shape is generated within the image data so that the tint block pattern having a predetermined or desired shape may be added to the image data. With the above-described configuration, the area generation unit 240 acquires a template corresponding to the area shape input through the instruction input unit 210 from the storage unit 260 so that the supplemental data-embedded area having a predetermined or desired shape may be generated.

The supplemental data acquisition unit 250 acquires data to be embedded in the image data (hereinafter "supplemental data"). Specific examples of the supplemental data include security data prohibiting duplication of the image data, identification data of a device to which the image data is output, data to manage a copyright of the image data, and an URL indicating a location of the image data. The controller 110, the communication interface 120, or the user interface 160, each illustrated in FIG. 2, may serve as the supplemental data acquisition unit 250. Alternatively, the removable recording medium reading device 170 may be used to acquire the supplemental data from the removable recording medium serving as an external device.

The supplemental data acquisition unit 250 inputs data specified by the user through the instruction input unit 210 as the supplemental data, or acquires the supplemental data corresponding to a setting instruction specified by the user from the storage unit 260. Examples of the supplemental data corresponding to the setting instruction specified by the user are described in detail below.

A variety of data is added to the image data based on a type and usage of the image data to meet increasing demand for improved usability of the image data with higher security. For example, when the user selects a secret data output mode to output the image data, data for prohibiting duplication of the image data is added to the image data. When the image data having the above-described supplemental data is read by a device to have duplication of the image data, the device may recognize that the image data is prohibited from duplication by virtue of the supplemental data, and therefore, a series of processes may be forcibly cancelled.

Another example of the supplemental data corresponding to the setting instruction includes a security instruction specified by an administrator of the MFP 100. In this case, identification data for the MFP 100 outputting the image data or for the user of the MFP 100, and tracking data, such as output date of the image data, are added to the image data as the supplemental data. Data such as a time when the image data is output, a device which outputs the image data, and a person who outputs the image data may be obtained by adding the identification data of the MFP 100 to the image data.

The storage unit 260 stores a variety of data used for processing performed in the MFP 100. In other words, the storage unit 260 stores data on the supplemental data-embedded area (hereinafter "area data"), and data to convert the supplemental data input from the supplemental data acquisition unit 250 into the tint block pattern. Here, the area data means data indicating a size of the supplemental data-embedded area. Alternatively, the main memory 113 in the controller 110 or the HDD 180, each illustrated in FIG. 2, may store data.

The data embedding unit 270 converts the supplemental data input from the supplemental data acquisition unit 250 into the tint block pattern by using the data stored in the storage unit 260 so that the tint block pattern thus converted is superimposed on the image data. At this time, the tint block pattern is superimposed only on the supplemental data-embedded area generated by the area generation unit 240. The controller 110 illustrated in FIG. 2 may function as a data embedding unit.

Figure 6:
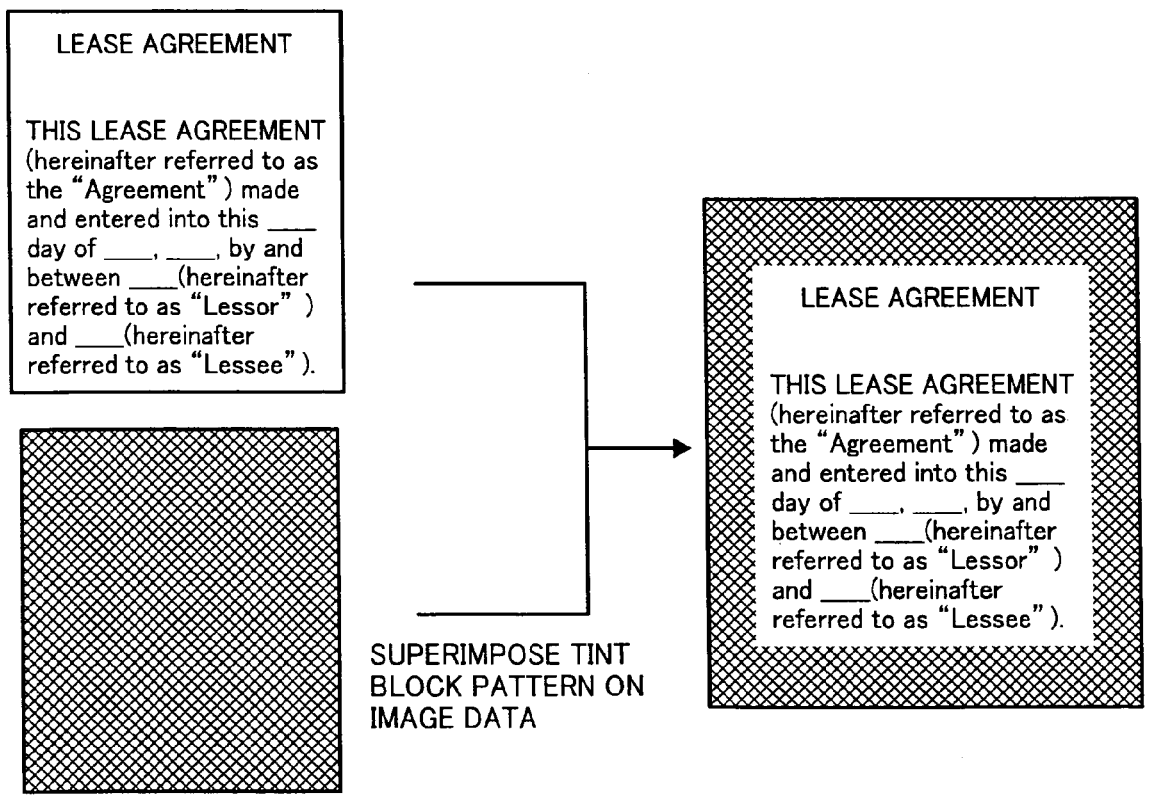
FIG. 6 is a view illustrating an example of processing performed by a data embedding unit.

The data embedding unit 270 converts the supplemental data into the tint block pattern as described below. The data embedding unit 270 acquires the supplemental data represented by bit strings, and converts the supplemental data into the tint block pattern for each bit by using the data stored in the storage unit 260. Thereafter, the data embedding unit 270 superimposes the tint block pattern thus converted on the image data. At this time, the tint block pattern may be superimposed on the image data, or tint block pattern data generated from the tint block pattern may be superimposed on the image data as illustrated in FIG. 6.

In other words, referring to FIG. 7, the data embedding unit 270 acquires the supplemental data for each bit, and aligns each of the acquired bits in a two-dimensional array having a predetermined or desired size (hereinafter "single two-dimensional array"). Subsequently, the data embedding unit 270 repeatedly aligns the singe two-dimensional array in vertical and horizontal directions to generate a two-dimensional array having the size of the image data detected by the size detection unit 230. Thereafter, each of the single two-dimensional arrays which overlaps the supplemental data-embedded area generated by the area generation unit 240 is converted into the tint block pattern, and the tint block pattern thus converted is superimposed on the image data. Repeatedly aligned bit strings of the supplemental data may be converted into the tint block pattern so that the supplemental data may be more accurately extracted.

Moreover, the data embedding unit 270 may convert the supplemental data into the tint block pattern based on a type of the tint block pattern input by the user through the instruction input unit 210, or set in the MFP 100 as a default setting.

The image data output unit 280 then outputs the image data having the supplemental data. The image data may be output to an external device via the communication interface 120, or may be printed on a predetermined or desired medium such as a sheet by using the printer engine 140. Moreover, the image data may be displayed on a panel by using the user interface 160.

Figure 8:
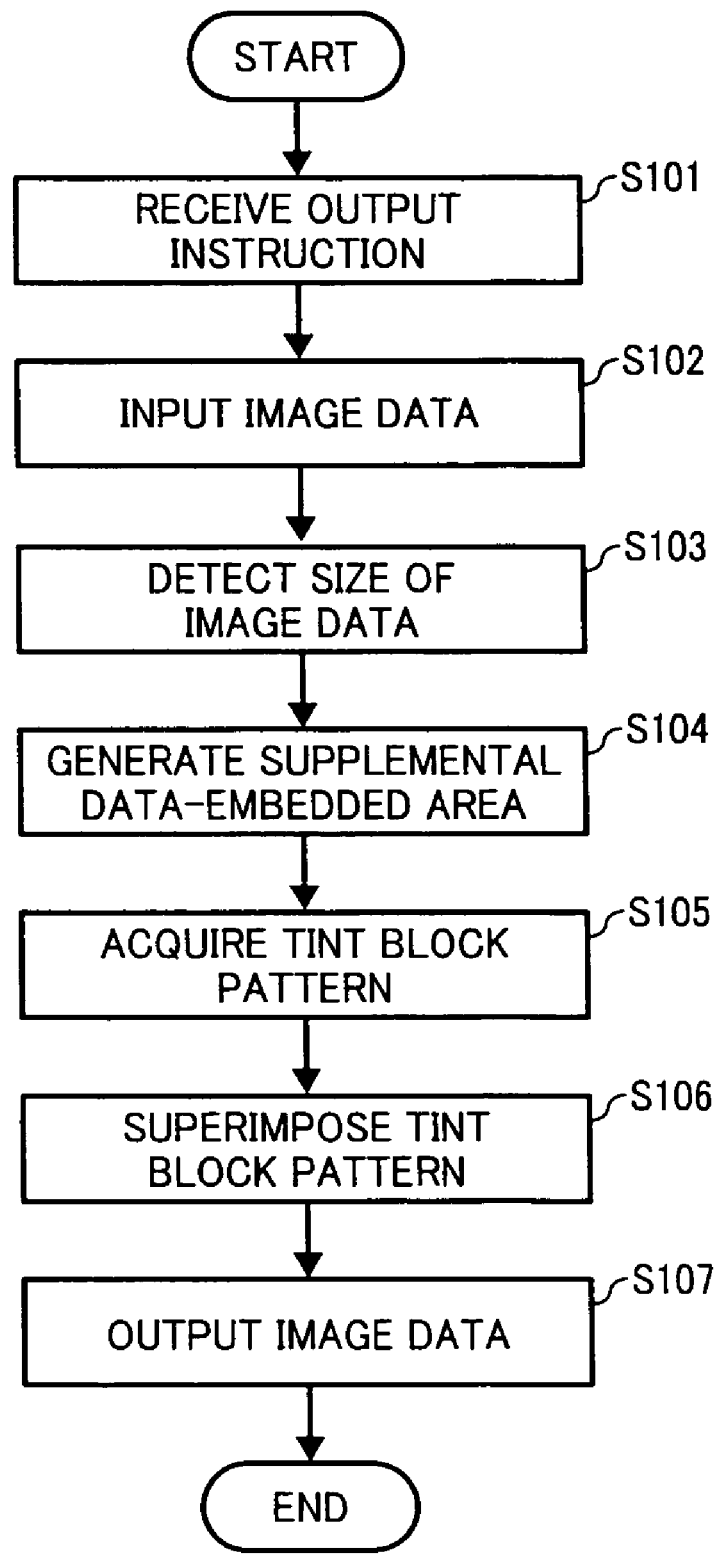
FIG. 8 is a flowchart illustrating a series of processing steps in the MFP according to the first example embodiment.

A series of processing steps performed by the MFP 100 according to the first example embodiment to generate image data with supplemental data embedded therein is described in detail below with reference to the flow chart shown in FIG. 8.

At S101, the instruction input unit 210 receives an instruction to output the image data from the user. Simultaneously, the instruction reception unit 210 receives an instruction from the user to embed the tint block pattern in the image data and output the image data having the tint block pattern.

At S102, the image data input unit 220 inputs the image data in which the supplemental data is to be embedded. The image data thus input is stored in the HDD 180 or the main memory 113, each serving as the storage unit.

At S103, the size detection unit 230 reads out the image data stored in the storage unit to detect a size of the image data. The detected size of the image data is stored in the storage unit. At S104, the area generation unit 240 reads out the image data including the content data stored in the storage unit, and generates the supplemental data-embedded area without overlapping with the content data in the image data. Data on the supplemental data-embedded area thus generated is stored in the storage unit.

Instead of generating the supplemental data-embedded area in all areas that do not overlap the content data, the area generation unit 240 generates the supplemental data-embedded area in only certain limited areas in order to maintain the visual quality of the content data. However, it is desirable that the supplemental data-embedded area has a width greater than a threshold, for example, 1 cm or more, to reliably reproduce the supplemental data and accurately extract the supplemental data embedded in the image data.

At S105, the supplemental data acquisition unit 250 acquires the supplemental data to be embedded in the image data, and converts the acquired supplemental data into the tint block pattern based on the data stored in the storage unit 260.

At S106, the data embedding unit 270 reads out the area data from the storage unit 260, and superimposes the tint block pattern converted by the supplemental data acquisition unit 250 on the image data only in an area corresponding to the read area data.

Finally, at S107, the image data output unit 280 receives the image data on which the tint block pattern is superimposed, and outputs the image data having the tint block pattern thereon. Thus, embedding of the supplemental data in the image data including the content data is completed.

As described above, the area generation unit 240 generates the supplemental data-embedded area in an area that does not overlap the content data. Accordingly, even when the supplemental data is added to the image data by superimposing the tint block pattern on the image data, the image data having the content data thereon with better visual quality may be reliably formed.

It is to be noted that the removable recording medium read by the removable recording medium reading device 170 is not limited to the above-described examples, and alternatively not only an SD card but also a memory such as a compact flash (trademark), a memory card, a smart media (trademark), a memory stick (trademark), and a picture card, and any detachably attachable type recording media may be used, either alone or in combination.

The above-described functions may be performed by any computer executable programs described in legacy programming languages such as Assembler, C, C++, C#, and Java (trademark), or object-oriented programming languages, and may be stored in any device-readable recording media, including but not limited to a ROM, an EEPROM, an EPROM, a flash memory, a flexible disk, a CD-ROM, a CD-RW, a DVD, an SD card, and an MO.

An image processing device according to a second example embodiment is described in detail below with reference to FIGS. 9 through 12.

According to the second example embodiment, even when only a predetermined or desired area of the image data is output by an image forming apparatus, the content data may clearly appear in the image data having the supplemental data, and the supplemental data may be accurately extracted.

A case in which only the predetermined or desired area of the image data is output by the image forming apparatus is described in detail below with reference to FIG. 9.

Figure 9:
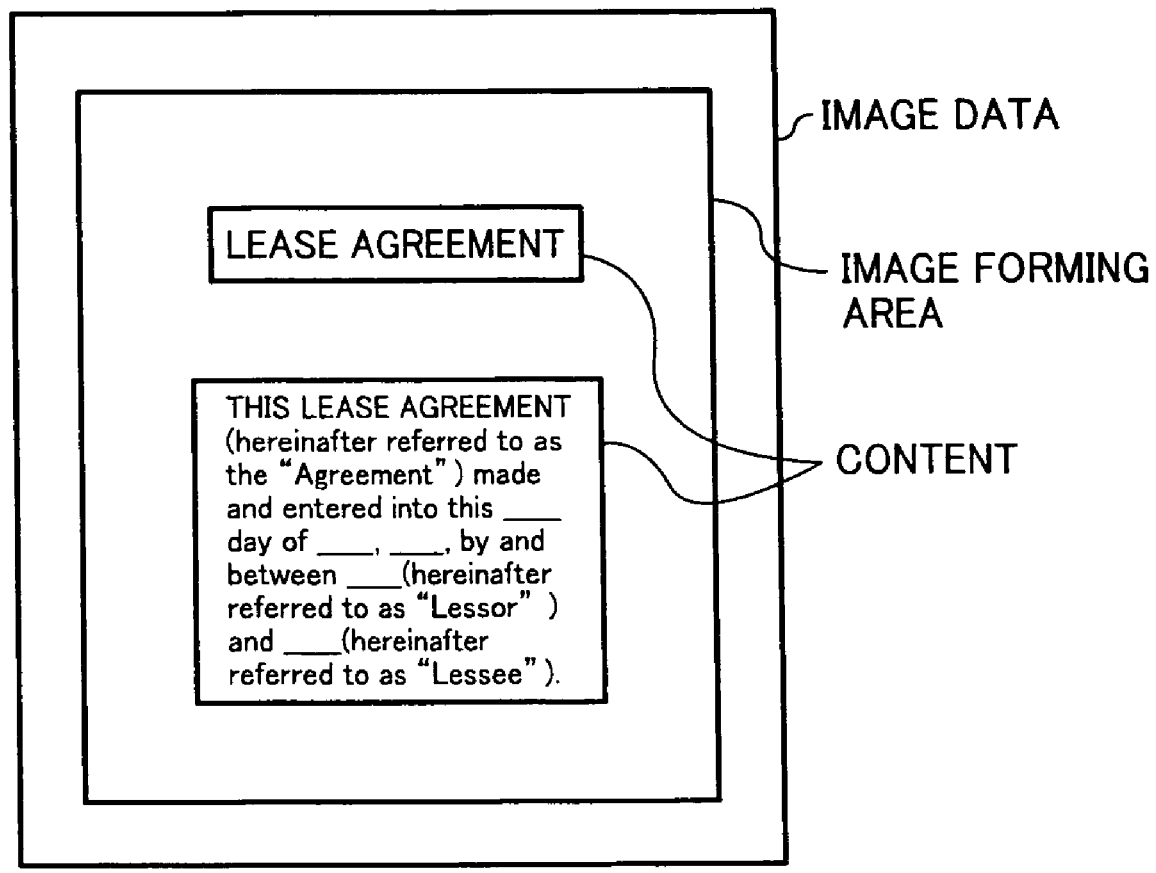
FIG. 9 is a view illustrating a relation between a drawing area and the image data.

In FIG. 9, each rectangle, in order from the largest to the smallest, indicates image data, an area where an image may be formed by the image forming apparatus (hereinafter "image forming area"), and a content where the content data included in the image data exists, respectively. As is clear from FIG. 9, a whole area in the image data may not be included in the image forming area depending on a specification of the image forming apparatus. In such a case, even when the supplemental data-embedded area in which the tint block pattern is to be embedded is generated from the edge of the image data, the image data having the tint block pattern thereon may not be output unless the supplemental data-embedded area is included in the image forming area.

To solve such a problem, in the second example embodiment, a supplemental data-embedded area that does not overlap the content data included in the image data is generated based on the image forming area.

Figure 10:
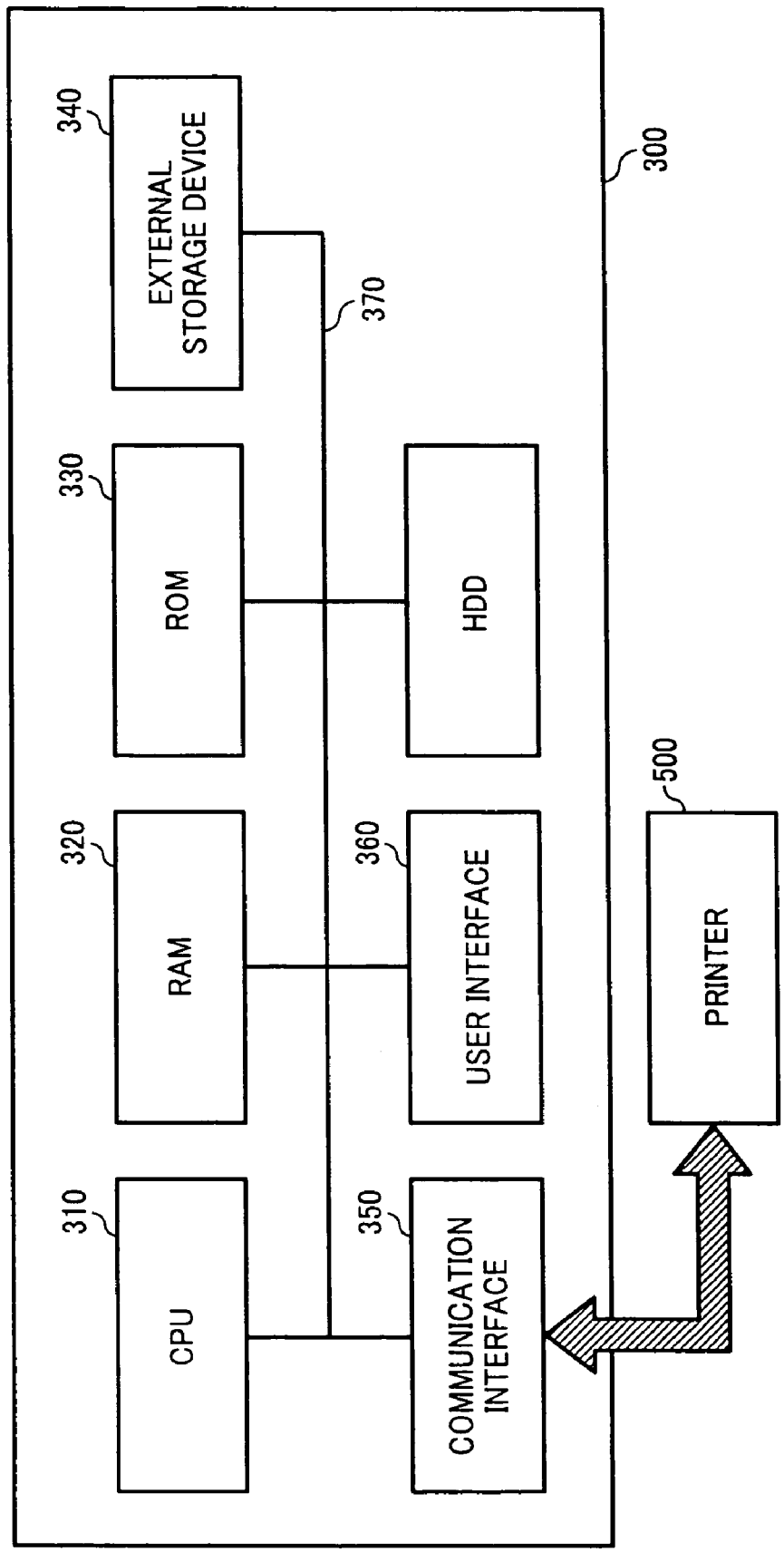
FIG. 10 is a schematic view illustrating a hardware configuration of a PC serving as an image processing device according to a second example embodiment.

In the second example embodiment, a personal computer (PC) 300 in which a printer driver is installed is used as the image processing device, and FIG. 10 is a schematic view illustrating a hardware configuration of the PC 300. A description of components having configurations and functions identical to the components described in the first example embodiment is omitted.

The PC 300 includes a CPU 310, a RAM 320, a ROM 330, an external storage device 340, a communication interface 350, a user interface 360, and a bus line 370. The PC 300 is connected to a printer 500 via a network.

The ROM 330 and the external storage device 340 store software applications such as an operating system and a print data generation program. The CPU 310 performs the software applications stored in the ROM 330 and the external storage device 340, and controls devices connected with the bus line 370 as a whole. The RAM 320 serves as a main memory of the CPU 310 such as a work area. The external storage device 340 stores various applications such as a boot program and an operating system.

The communication interface 350 communicates with external devices of the PC 300 under the control of the CPU 310. The communication interface 350 may include an Ethernet (trademark) interface, an IEEE 1284 interface, or other interface.

The user interface 360 displays data sent from the CPU 310, and sends data input by the user to the CPU 310. In other words, the user may obtain and input the data through the user interface 360. The user interface 360 may include, for example, a display such as an LCD and a CRT display, a pointing device such as a mouse and a touch pen, and a keyboard either alone or in combination. Moreover, the user interface 360 may include a touch panel, an audio interface, and so forth.

The bus line 370 electrically connects the CPU 310 to the ROM 330, the communication interface 350, the user interface 360, and so forth. An address bus, a data bus, or the like may serve as the bus line 370.

A description is now given of functions provided in the PC 300 with reference to FIG. 11.

FIG. 11 is a functional block diagram illustrating the PC 300. Referring to FIG. 11, the PC 300 includes an instruction input unit 410, an image data input unit 420, an output area acquisition unit 430, an area generation unit 440, a supplemental data acquisition unit 450, a storage unit 460, a data embedding unit 470, and an image data output unit 480.

The instruction input unit 410 receives an instruction from the user operating the PC 300. Specific examples of the instruction received from the user include instructions to input and output image data and to set input and output conditions. In addition, the instruction input unit 410 receives an instruction to embed the supplemental data in the image data. The instruction input unit 410 may provide an instruction menu to the user to prompt the user to input an appropriate instruction. Here, the user interface 360 illustrated in FIG. 10 in which a keyboard, a display, or the like is included, serves as the instruction input unit 410.

The image data input unit 420 generates or acquires image data in which supplemental data is to be embedded, and inputs the image data. The input image data is stored in the storage unit 460. The communication interface 350 may serve as the image data input unit 420. The image data input unit 420 may acquire the image data from a floppy disk, a USB memory, and so forth through the external storage device 340.

The output area acquisition unit 430 acquires data on an area where an image may be formed (hereinafter "image forming area data") from the printer 500 connected via the network. Here, the communication interface 350 serves as the output area acquisition unit 430. The acquired image forming area data is stored in the storage unit 460.

In place of the communication interface 350, the CPU 310 may serve as the output area acquisition unit 430. In addition, the image forming area data of the printer 500 may be acquired not only from the printer 500 but also from the ROM 330 or the external storage device 340, each serving as the storage unit 460. When the image forming area data is acquired from the storage unit 460, it is desirable that identification data and the image forming area data of the printer 500, which are associated with each other, are stored in the storage unit 460. As a result, the output area acquisition unit 430 may acquire not only the image forming area data of the printer 500 but also that of other image forming apparatuses such as other printers and MFP.

In other words, the output area acquisition unit 430 receives designation of an image forming apparatus to output the image data from the instruction input unit 410, and acquires the image forming area data of the designated image forming apparatus by searching the data stored in the storage unit 460 based on the received designation. An example of the associated data stored in the storage unit 460 is illustrated in FIG. 12.

The area generation unit 440 generates the supplemental data-embedded area in the image data based on the image forming area data and the content data acquired by the output area acquisition unit 430. At this time, the area generation unit 440 generates the supplemental data-embedded area around the content data within the image forming area. Here, the CPU 310 illustrated in FIG. 10 serves as the area generation unit 440.

The area generation unit 440 acquires the image data in which the supplemental data is to be embedded from the storage unit 460 to acquire the content included in the image data. The acquisition of the content is performed in the same way as the above-described steps performed by the area generation unit 240 according to the first example embodiment.

The area generation unit 440 reads out the image forming area data from the storage unit 460 separately from the content, and generates the supplemental data-embedded area around the content within the read image forming area. Relative positions of the image forming area and the content may be represented by coordinates, or may be acquired by performing logical operations after overlaying the image forming area with the content.

Alternatively, the area generation unit 440 may generate the supplemental data-embedded area based on a designation of the area shape input by the user through the instruction input unit 410. Specifically, the supplemental data-embedded area corresponding to the area shape is generated within the image data so that the tint block pattern having a predetermined or desired shape may be added to the image data. In the above-described configuration, the area generation unit 440 acquires a template corresponding to the designation of the area shape input through the instruction input unit 410 from the storage unit 460 so that the supplemental data-embedded area having the predetermined or desired shape may be generated.

It is desirable to generate the supplemental data-embedded area from an edge of the image forming area. As a result, the tint block pattern is reliably superimposed on the edge of the image data when being output, and may be immediately detected when being scanned by a scanner or the like.

The description below compares a case in which the supplemental data is added to the image data based only on the content in the image data with a case in which the supplemental data is added to the image data by the area generation unit 440 according to the second example embodiment. In both of the above-described cases, an image forming apparatus in which an image forming area is set is designated as an output destination. When the supplemental data is added to the image data only based on the content, a tint block pattern properly superimposed on the image data is omitted when being output. Therefore, the supplemental data may not be properly added to the image data. However, the area generation unit 440 according to the second example embodiment superimposes the tint block pattern on the image data based on both the content and the image forming area data. As a result, the tint block pattern is not omitted when being output, so that the supplemental data may be reliably added to the image data without compromising the visual quality of the content data.

Figure 13:
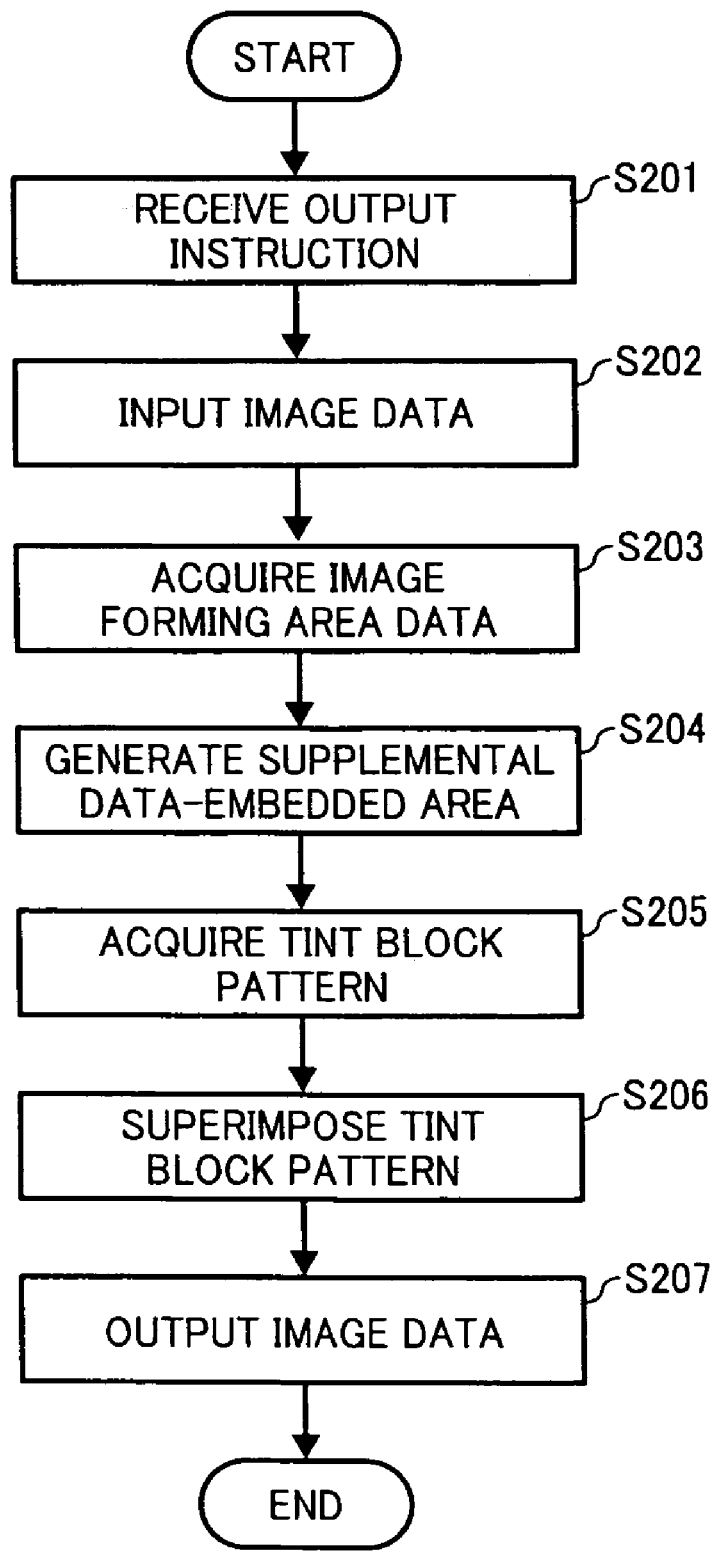
FIG. 13 is a flowchart illustrating a series of processing steps performed in the PC according to the second example embodiment.

A series of processing steps in the image processing device having the above-described configuration according to the second example embodiment is described in detail below with reference to FIG. 13.

It is to be noted that each of the supplemental data acquisition unit 450, the storage unit 460, the data embedding unit 470, and the image data output unit 480 performs processing identical to the processing performed by each of the supplemental data acquisition unit 250, the storage unit 260, the data embedding unit 270, and the image data output unit 280 according to the first example embodiment, respectively.

At S201, the instruction input unit 410 receives an instruction to output the image data from the user. Simultaneously, the instruction reception unit 410 receives an instruction to embed the tint block pattern in the image data and output the image data having the tint block pattern thereon from the user.

At S202, the image data input unit 420 inputs the image data in which the supplemental data is to be embedded. The image data thus input is stored in the ROM 330 or the external storage device 340.

At S203, the output area acquisition unit 430 acquires the image forming area data of the image forming apparatus serving as the output destination.

At S204, the area generation unit 440 generates the supplemental data-embedded area based on both the content in the image data and the image forming area data read out from the storage unit 460. Thereafter, conversion of the acquired supplemental data into the tint block pattern at S205, superimposing of the tilt block pattern on the supplemental data-embedded area at S206, and output of the image data having the tint block pattern thereon at S207 are respectively performed in the same way as in the processing steps of S105 to S107 according to the first example embodiment described above. Thus, a description of the processing performed from S205 to S207 is omitted.

As described above, in the second example embodiment, the area generation unit 440 superimposes the tint block pattern on the image data based on both the content and the image forming area data. As a result, the tint block pattern is not omitted when being output, and therefore, the supplemental data may be reliably added to the image data without compromising the visual quality of the content data.

Although the MFP 100 serves as the image processing device in the first example embodiment and the PC 300 serves as the same in the second example embodiment, alternatively the PC 300 may serve as the image processing device in the first example embodiment and the MFP 100 may serve as the same in the second example embodiment.

In addition, the external storage device 340 is not limited to the above-described examples. Not only an SD card, but also a memory such as a compact flash (trademark), a memory card, a smart media (trademark), a memory stick (trademark), and a picture card, and any detachably attachable type recording media may be used either alone or in combination as the external storage device 340.

The functions described above may be performed by any computer-executable program described in legacy programming languages such as Assembler, C, C++, C#, and Java (trademark), or object-oriented programming languages, and may be stored in any device-readable recording media, including, but not limited to, a ROM, an EEPROM, an EPROM, a flash memory, a flexible disk, a CD-ROM, a CD-RW, a DVD, an SD card, and an MO.

Examples of the image processing device are not limited to the MFP 100 and the PC 300 having the above-described functions, and any device that may exchange data with a removable recording medium may serve as the image processing device according to example embodiments. Specific examples of the image processing device include a server, an image forming apparatus such as a copier and a printer, a portable data terminal such as a cellular phone, a PDA, and a portable electric entertainment device, an image reading device such as a scanner, an imaging device such as a digital camera and a digital video camera, an audio-visual input and output device such as a television, an HDD recorder, and an audio set, a vehicle-mounted electric device such as a car navigation system, and a digital home electronics.

Example embodiments are not limited to the details described above, and various modifications and improvements are possible without departing from the spirit and scope of example embodiments. It is therefore to be understood that, within the scope of the associated claims, example embodiments may be practiced otherwise than as specifically described herein. For example, elements and/or features of different illustrative example embodiments may be combined with each other and/or substituted for each other within the scope of example embodiments.

What is claimed is:

1. An image processing device, comprising:
   an area generation unit configured to generate a supplemental data-embedded area in image data having content data separate from an area occupied by the content data; and
   a data embedding unit configured to embed supplemental data in the supplemental data-embedded area,
   wherein the supplemental data comprises data indicating image data type.

2. The image processing device according to claim 1, wherein the area generation unit generates the supplemental data-embedded area around the content data in the image data.

3. The image processing device according to claim 1, wherein the area generation unit generates a rectangular area circumscribing the content data, and generates the supplemental data-embedded area around the rectangular area.

4. The image processing device according to claim 1, wherein the area generation unit sets the supplemental data-embedded area based on a distance between edges of the image data and the content data.

5. The image processing device according to claim 4, wherein the area generation unit further sets the supplemental data-embedded area based on a threshold to reliably reproduce the supplemental data.

6. The image processing device according to claim 1, wherein the supplemental data comprises data indicating image data output history.

7. The image processing device according to claim 1, further comprising an output unit configured to output image data having the supplemental data embedded in the supplemental data-embedded area in the image data,
   wherein the area generation unit acquires image forming area data indicating an area where the output unit is capable of forming an image and generates the supplemental data-embedded area based on the image forming area data and the content data.

8. An image processing method, comprising:
   generating a supplemental data-embedded area in image data having content data separate from an area occupied by the content data; and
   embedding supplemental data in the supplemental data-embedded area,
   wherein the supplemental data comprises data indicating image data type.

9. The image processing method according to claim 8, wherein the supplemental data-embedded area is generated around the content data in the image data.

10. The image processing method according to claim 8, wherein the supplemental data-embedded area is generated around a rectangular area circumscribing the content data.

11. The image processing method according to claim 8, wherein the supplemental data-embedded area is set based on a distance between edges of the image data and the content data.

12. The image processing method according to claim 8, wherein the supplemental data-embedded area is further set based on a threshold to reliably reproduce the supplemental data.

13. The image processing method according to claim 8, wherein the supplemental data comprises data indicating image data output history.

14. The image processing method according to claim 8, further comprising acquiring an image forming area data indicating an area where an output unit configured to output the image data having the supplemental data thereon is capable of forming an image,
   wherein the supplemental data-embedded area is generated based on the image forming area data and the content data.

15. A non-transitory computer readable recording medium storing a program for causing a computer to perform the image processing method comprising:
   generating a supplemental data-embedded area in image data having content data separate from an area occupied by the content data; and
   embedding supplemental data in the supplemental data-embedded area
   wherein the supplemental data comprises data indicating image data type.

* * * * *